G. L. BREWER.
TOY.
APPLICATION FILED AUG. 5, 1912.
1,062,219.
Patented May 20, 1913.
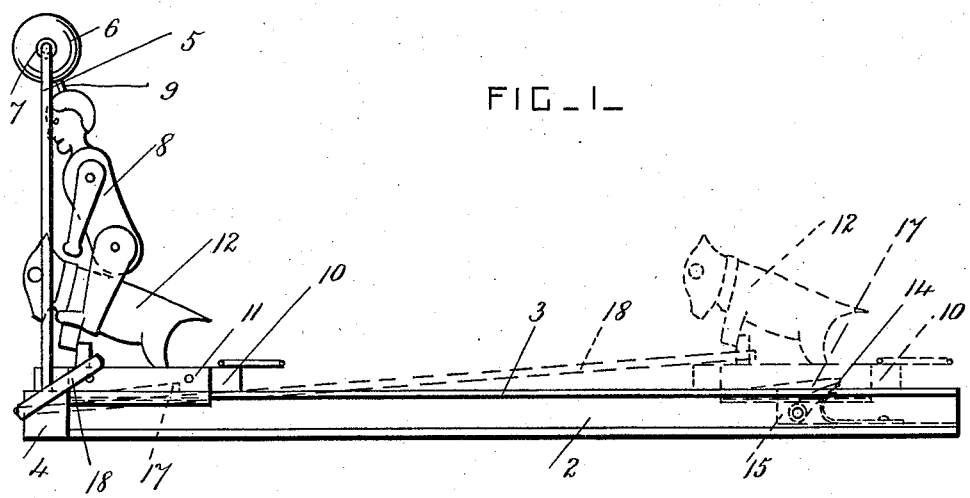
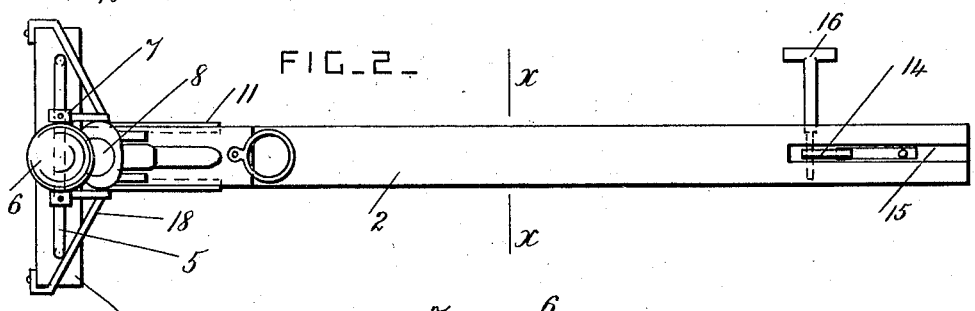
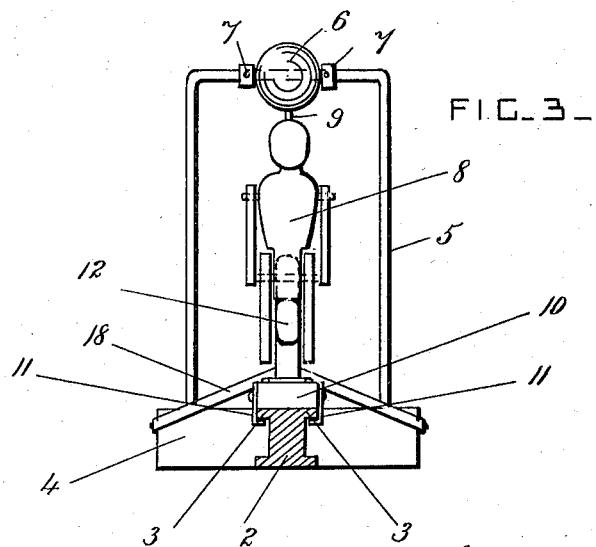
Witnesses
A. E. Davis,
Inventor
Governor L. Brewer
By Herbert W. Jenner.
Attorney

UNITED STATES PATENT OFFICE.

GOVERNOR L. BREWER, OF BEACH, NORTH DAKOTA, ASSIGNOR OF ONE-HALF TO JOSEPH MUSIL, OF BEACH, NORTH DAKOTA.

TOY.

1,062,219. Specification of Letters Patent. Patented May 20, 1913.

Application filed August 5, 1912. Serial No. 713,364.

*To all whom it may concern:*

Be it known that I, GOVERNOR L. BREWER, a citizen of the United States, residing at Beach, in the county of Billings and State of North Dakota, have invented certain new and useful Improvements in Toys; and I do hereby declare the following to be a full, clear, and exact description of the invention, such as will enable others skilled in the art to which it appertains to make and use the same.

This invention relates to toys provided with movable figures; and it consists in the novel construction and combination of the parts hereinafter fully described and claimed.

In the drawings, Figure 1 is a side view of a toy constructed according to this invention. Fig. 2 is a plan view of the same. Fig. 3 is a cross-section through the guide bar, taken on the line $x$—$x$ in Fig. 2.

The toy is provided with a longitudinal guide bar 2 of any convenient length, having flanges 3 at the top of its sides. A crosspiece 4 is secured to the front end of the guide bar, and 5 is an arch-shaped support secured to the crosspiece. A ball 6 is journaled on the top bar of the arch between suitable collars or stops 7, and 8 is the figure of a man having jointed limbs and suspended from the ball by a stiff rod 9.

A block 10 of any suitable material is arranged to slide longitudinally on the guide bar 2, and 11 are plates secured to the block and engaging with the flanges 3. A figure 12 of an animal, such as a ram or goat, is mounted on the block 10, and the forehead of the animal figure is arranged in line with the lower part of the body of the human figure. A spring-pressed catch 14 is pivoted in a slot 15 in the rear part of the guide bar, and is provided with an operating handle or knob 16. A notch 17 is formed in the underside of the block 10.

A band 18 of elastic material is secured to the block 10 and to the crosspiece 4. When the block 10 is retracted by hand against the pull of the spring band 18, its notch 17 engages with the catch 14, so that the block with the animal figure is held at the rear end of the guide bar. When the catch is turned pivotally to release the block 10, the block is propelled along the guide bar by the spring band. The forehead of the animal figure strikes the human figure, and causes the human figure to turn a complete somersault over the top of the arch, and to drop onto the back of the animal figure into the position indicated by the unbroken lines in Fig. 1. The forward stroke of the block 10 is limited by the front edges of its guide plates which come in contact with the crossbar, or by any other suitable stop.

What I claim is:

1. In a toy, a longitudinal guide bar, a block and an animal figure slidable on the guide bar, a spring for propelling the block along the guide bar, a support secured to one end portion of the guide bar, and a human figure mounted to revolve upon the upper part of the said support and arranged in the path of the animal figure.

2. In a toy, a longitudinal guide bar having a crosspiece at one end, a block and an animal figure slidable on the guide bar, a spring attached to the said block and crosspiece, an arch-shaped support projecting from the crosspiece, and a human figure having a bearing rigidly secured to its head portion and mounted to revolve on the top part of the said support, said human figure being arranged in the path of the said animal figure.

In testimony whereof I have affixed my signature in the presence of two witnesses.

GOVERNOR L. BREWER.

Witnesses:
 A. C. SMITH,
 L. E. AUSTIN.

Copies of this patent may be obtained for five cents each, by addressing the "Commissioner of Patents, Washington, D. C."